(12) United States Patent
Bieck et al.

(10) Patent No.: US 7,562,854 B2
(45) Date of Patent: Jul. 21, 2009

(54) HOLDER FOR A BEVERAGE CONTAINER, FOR INSTALLATION IN A MOTOR VEHICLE

(75) Inventors: Torsten Bieck, Luebeck (DE); Viktor Kulajew, Baiersbronn (DE)

(73) Assignee: fischer automotive systems GmbH, Horb (DE)

( * ) Notice: Subject to any disclaimer, the term of this patent is extended or adjusted under 35 U.S.C. 154(b) by 0 days.

(21) Appl. No.: 11/249,299

(22) Filed: Oct. 13, 2005

(65) Prior Publication Data

US 2006/0081131 A1    Apr. 20, 2006

(30) Foreign Application Priority Data

Oct. 15, 2004    (DE)    ........................ 10 2004 050 286

(51) Int. Cl.
*A47K 1/08*    (2006.01)
(52) U.S. Cl. .................. 248/311.2; 248/132; 224/926
(58) Field of Classification Search .............. 248/311.2, 248/132; 297/188.1, 188.14, 188.05, 188.16; 224/196, 281, 926, 275
See application file for complete search history.

(56) References Cited

U.S. PATENT DOCUMENTS

| | | | | | |
|---|---|---|---|---|---|
| 1,228,098 | A | * | 5/1917 | Cole | 169/27 |
| 1,237,217 | A | * | 8/1917 | Poltronieri | 232/41 E |
| 1,302,125 | A | * | 4/1919 | Bechoff | 232/41 A |
| 1,345,463 | A | * | 7/1920 | Sandberg | 248/231.61 |
| 1,351,359 | A | * | 8/1920 | Wamback | 232/41 E |
| 1,741,136 | A | * | 12/1929 | Naylor | 248/231.41 |
| 2,266,001 | A | * | 12/1941 | Christianson | 248/132 |
| 2,965,890 | A | * | 12/1960 | Robillard | 340/568.8 |
| 3,533,583 | A | * | 10/1970 | Azim | 248/125.2 |
| 4,583,707 | A | * | 4/1986 | Anderson | 248/292.13 |
| 4,724,986 | A | * | 2/1988 | Kahn | 224/544 |
| 5,320,263 | A | * | 6/1994 | Kobylack | 224/274 |
| 5,580,020 | A | * | 12/1996 | Catchings | 248/311.2 |
| 5,598,999 | A | * | 2/1997 | Plocher et al. | 248/311.2 |
| 5,634,621 | A | * | 6/1997 | Jankovic | 248/311.2 |
| 5,842,671 | A | * | 12/1998 | Gibbs | 248/231.41 |
| 6,427,960 | B1 | | 8/2002 | Gehring et al. | |
| 6,427,961 | B1 | * | 8/2002 | Dieringer et al. | 248/311.2 |
| 6,435,469 | B1 | * | 8/2002 | Ratcliff et al. | 248/535 |
| 6,550,736 | B2 | * | 4/2003 | Schaal | 248/311.2 |
| 6,647,248 | B1 | * | 11/2003 | Ortscheid et al. | 455/575.1 |
| 6,715,726 | B1 | * | 4/2004 | Dybalski | 248/311.2 |
| 6,785,567 | B2 | * | 8/2004 | Kato | 455/575.9 |

(Continued)

FOREIGN PATENT DOCUMENTS

DE    197 52 385 A1    5/1999

(Continued)

*Primary Examiner*—J. Allen Shriver, II
*Assistant Examiner*—Michael McDuffie
(74) *Attorney, Agent, or Firm*—Michael J. Stricker

(57) ABSTRACT

A holder for a beverage container, for installation in a motor vehicle has a receiver open to a top for insertion of a beverage container, guide unit, a support which is guided by the guide unit so as to be movable back and forth between a lowered position and a raised position, the support in the raised position providing a beverage container inserted into the receiver with a lateral support above the receiver, an unlockable locking device which holds the support in the lowered position, and a locking device which holds the support in the raised position.

10 Claims, 1 Drawing Sheet

U.S. PATENT DOCUMENTS

| | | |
|---|---|---|
| 7,017,243 B2 * | 3/2006 | Carnevali .................... 24/523 |
| 2001/0023872 A1 | 9/2001 | Schierling et al. |
| 2003/0098402 A1 * | 5/2003 | Kaupp .................... 248/311.2 |
| 2004/0069792 A1 | 4/2004 | Schaal |
| 2006/0278790 A1 * | 12/2006 | Park .................... 248/311.2 |

FOREIGN PATENT DOCUMENTS

| | | |
|---|---|---|
| DE | 199 30 524 A1 | 2/2000 |
| DE | 100 15 197 A1 | 10/2001 |
| DE | 201 21 384 U1 | 10/2002 |
| DE | 202 16 673 U1 | 4/2003 |
| DE | 202 16 674 U1 | 4/2003 |
| DE | 202 16 675 U1 | 4/2003 |
| DE | 101 59 146 A1 | 6/2003 |
| DE | 102 17 157 A1 | 11/2003 |
| DE | 102 31 519 A1 | 1/2004 |
| DE | 203 16 541 U1 | 1/2004 |
| EP | 1 410 946 A1 | 4/2004 |
| JP | 10129327 A | 5/1998 |

* cited by examiner

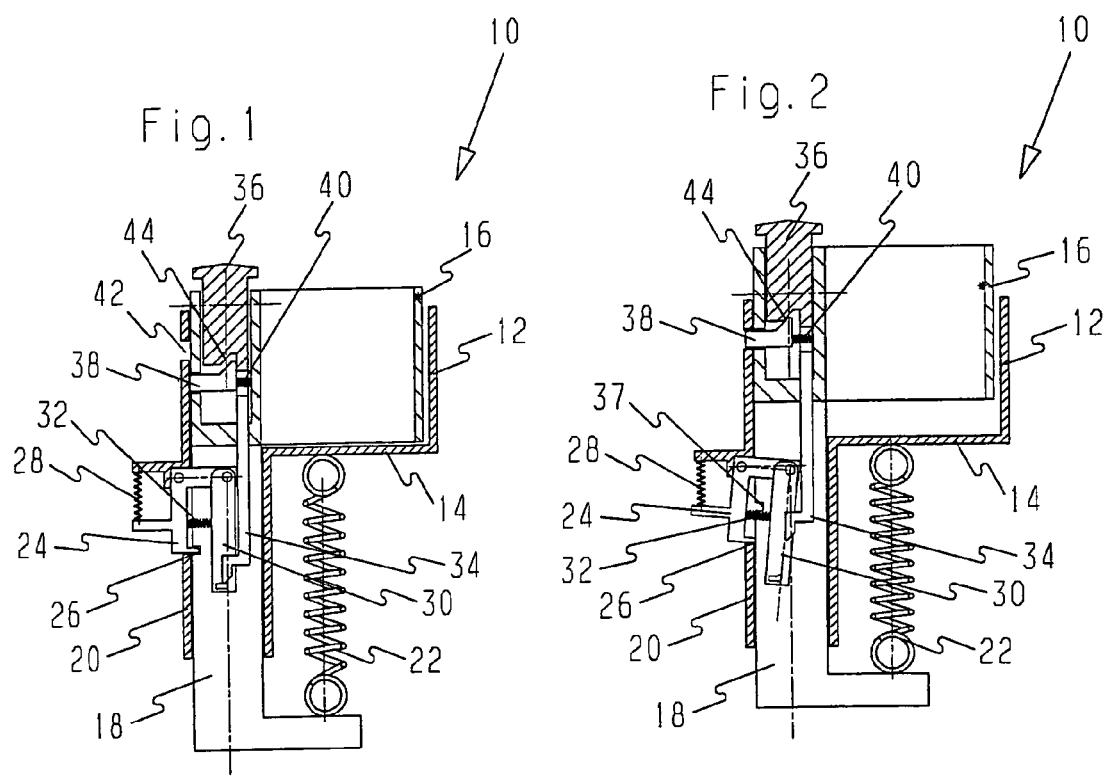

HOLDER FOR A BEVERAGE CONTAINER, FOR INSTALLATION IN A MOTOR VEHICLE

CROSS-REFERENCE

The invention described and claimed hereinbelow is also described in DE 10 2004 050 286.2, filed on Oct. 15, 2004. This German Patent Application, whose subject matter is incorporated here by reference, provides the basis for a claim of priority of invention under 35 U.S.C. 119 (a)-(d).

BACKGROUND OF THE INVENTION

The invention relates to a holder for a beverage container, for installation in a motor vehicle.

Holders of such a kind are known per se. They are used for holding beverage containers such as, for example, beverage cans, beakers and cups so that they are prevented from tipping and they can also be used in miscellaneous land, air or water-going vehicles. Known holders have a customarily cylindrical recess, open to the top, as a receiver for insertion of a beverage container, "to the top" referring to the intended installation position of the holder. It is also known to provide a support, for example of annular shape, which is movably guided into a raised position above the receiver. The support provides an inserted beverage container with lateral support higher up than the receiver and as a result increases the security of the inserted beverage container against tipping, especially in the case of a relatively tall beverage container.

SUMMARY OF THE INVENTION

It is therefore an object of the present invention to provide a holder for a beverage container, for installation in a motor vehicle, which is designed for preventing unintentional movement of the support of a holder of the kind mentioned hereinbefore.

In keeping with these objects and with others which will become apparent hereinafter, one feature of the present invention resides, briefly stated, in a holder for a beverage container, for installation in a motor vehicle, comprising a receiver open to a top for insertion of a beverage container; guide means; a support which is guided by said guide means so as to be movable back and forth between a lowered position and a raised position, said support in said raised position providing a beverage container inserted into said receiver with a lateral support above said receiver; an unlockable locking device which holds said support in said lowered position; and a locking device which holds said support in said raised position.

The holder according to the invention has an unlockable locking device for the support, which holds the support in a lowered position and in a raised position. The holder can have an individual locking device for each position or a common locking device for both positions. In the raised position, the locking device holds the support so that it is prevented from being pushed downwards unintentionally, for example when a beverage container is being inserted.

In an embodiment of the invention, an unlocking element is provided for manual unlocking of the locking device. The unlocking element is a finger-operable element, for example a button or a slider. The support of the holder can be unlocked only by intentionally actuating the unlocking element, that is to say, for example, by depressing the unlocking button.

In a development of the invention, the locking device is so provided that it locks the support on movement into the lowered position even when the unlocking element is actuated, that is to say, for example, when the unlocking button is depressed. This facilitates locking in the lowered position because the unlocking element, which has to be actuated to unlock the support in the raised position, does not need to be released during lowering in order for the support to become locked in the lowered position.

In an embodiment of the invention, an annular support is provided which is, as a result, matched to the usually circular cross-section of beverage containers.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1 and 2 of the drawings are views showing a holder for a beverage container, for installation in a motor vehicle, in accordance with the present invention, in a sectional view in two different positions.

DESCRIPTION OF THE PREFERRED EMBODIMENTS

A holder 10 according to the invention which is shown in the drawings is intended for installation in a motor vehicle (not shown). The holder 10 shown is in the form of a double holder for the insertion of two beverage containers. It has two tubular receivers 12, arranged next to one another, for insertion, in each case, of a beverage container (not shown) such as, for example, a beverage can, a bottle, a beaker or a cup.

The two receivers 12 are located behind one another in the selected viewing direction, one in front of and one behind the plane of the drawing. For the sake of clarity, one of the two receivers 12 is shown displaced into the plane of the drawing. On the underside, the receivers 12 are closed off by means of a base 14; to the top the receivers 12 are open for insertion of the beverage container, "under" and "top" referring to the intended position of installation and use of the holder 10.

Tubular supports 16 are telescopically accommodated within the receivers 12 for providing a lateral support for beverage containers received in the receivers 12. The supports 16 are open to the top and to the bottom. They can be moved from a lowered position, shown in FIG. 1, into a raised position, shown in FIG. 2 in the lowered position, the supports 16 are located within the receivers 12; in the raised position, the supports 16 project out from the receivers 12 in an upwards direction, extending, as it were, the receivers 12 in an axial direction.

The supports 16 are mounted on a header 18 arranged between them, which is displaceably guided inside a downwardly projecting tubular extension 20 between the receivers 12. The header 18 and the extension 20 form a slideway for the two supports 16.

A spring element 22 moves the supports 16 into the raised position. In the exemplary embodiment shown, a helical tension spring 22 acting on the base 14 of a receiver 12 and the lower end of the header 18 is used as the spring element.

An angled lever 24 is pivotally mounted on the tubular extension 20. The angled lever 24 has an arm which extends downwards, parallel to the header 18, and another arm which projects in a transverse direction into the header 18, which is hollow in that region. At the end of the first arm, the angled lever 24 has a latching nose 26, which engages in a hole in the header 18 when the supports 16 are in the lowered position and which as a result holds the supports 16 locked in the lowered position against the force of the spring element 22. A spring element 28 urges the angled lever 24 into the described locked position.

Within the header 18, on the transversely extending arm of the angled lever 24 there is pivotally mounted a second lever 30, which is straight and one-armed and which extends in an approximately axial direction relative to the header 18. A spring element 32 abutting the angled lever 24 urges the second lever 30 away from the angled lever 24.

The second lever 30 co-operates with a control rod 34, which extends in an axially parallel direction inside the header 18. When the control rod 34 is pushed down, it acts on the second lever 30 and, by way of the latter, exerts a tensile force on the transversely extending arm of the angled lever 24. As a result, the angled lever 24 is so pivoted against the force of the spring element 28 biasing it so that its latching nose 26 comes out of engagement with the hole in the header 18. The header 18 and consequently the supports 16 are unlocked and are moved by the spring element 22 upwards into the raised position.

The angled lever 24, which holds the supports 16 in the lowered position against the force of the spring element 22 as a result of the engagement of its latching nose 26 in the hole in the header 18, forms, together with the second lever 30, which is pivotally mounted on it, a locking device 24, 26, 30. The control rod 34 is moved in a downwards direction as a result of pushing on an unlocking button 36, which is located at the top of the supports 16. The unlocking button 36 can also be referred to in general as an unlocking element. As a result of pushing on the unlocking button 36, that is to say as a result of actuating the unlocking element, the locking device 24, 26, 30 is unlocked by way of the control rod 34.

For locking the receivers 12 in the raised position shown in FIG. 2, a bolt 38 is arranged in the header 18 so as to be transversely displaceable. The bolt 38 is biased by a spring element 40 and is moved by the latter into a cut-out 42 in an upper region of the holder 10 when the support 16 is moved into the raised position. As a result, the support 16 is locked in the raised position. The bolt 38 co-operating with the cut-out 42 forms a locking device 38, 42 which holds the support 16 locked in the raised position.

When the unlocking button 36 is depressed, that is to say when the unlocking element is actuated, a sloping surface 44 of the unlocking button 36 urges the bolt 38 out of engagement with the hole 42 against the force of the spring element 40; the locking device 38, 42 is accordingly also unlocked by depressing the unlocking button 36. After unlocking, the supports 16 can be moved down into the lowered position against the force of the spring element 22. The downward movement of the support 16 can be accomplished by continued pressure on the unlocking button 36.

When the supports 16 reach the lowered position, which is shown in FIG. 1, the spring element 28 acting on the angled lever 24 urges the latching nose 26 of the angled lever 24 into the cut-out 27 in the header 18. The supports 16 are locked in the lowered position even when the unlocking button 36 is depressed, that is to say when the unlocking element is actuated. The spring element 32 can pivot the second lever 30, which is pivotally mounted on the angled lever 24, back into the path of the control rod 34 only once the unlocking button 36 has been released and the control rod 34 has, as a result thereof, moved in an upwards direction.

Only thereafter, by depressing the unlocking button 36 again, can the lever 30 be urged in a downwards direction by means of the control rod 34, pivoting the angled lever 24 together with the latching nose 26 from out of engagement with the header 18. For as long as the locking button 36 is held depressed during the downwards movement of the supports 16, the lever 30 rests against the side of the control rod 34, that is to say the control rod 34 holds the lever 30 pushed out to the side and does not come into engagement therewith.

In the raised position, the supports 16 provide beverage containers (not shown) inserted into the receivers 12 with lateral support higher up than the receivers 12 with the result that even tall beverage containers are held in the holder 10 so that they are prevented from tipping.

It will be understood that each of the elements described above, or two or more together, may also find a useful application in other types of constructions differing from the types described above.

While the invention has been illustrated and described as embodied in a holder for a beverage container, for installation in a motor vehicle, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A holder for a beverage container, for installation in a motor vehicle, comprising: a top side; a bottom side disposed opposite to said top side; opposing lateral sides disposed between said top side and said bottom side; a receiver open to a top for insertion of a beverage container; guide means; a support configured for accommodating a beverage container and telescopically accommodated inside said receiver for laterally supporting the beverage container and also guided by said guide means so as to be movable substantially vertically back and forth between a lowered position and a raised position, said support in said raised position providing a beverage container inserted into said receiver with a lateral support above said receiver; a first unlockable locking device which holds said support in said lowered position; and a second locking device having locking means which holds said support in said raised position, and an unlocking element for manual unlocking of said locking means, said unlocking element being disposed on the top side of the holder and being substantially vertically displaceable in said support and relative to said support, so that said second locking device is unlocked by downward displacement of said unlocking element inside said support and relative to said support.

2. A holder as defined in claim 1, wherein said locking device is configured so that it locks said support on movement into said lowered position even when said unlocking element is actuated.

3. A holder as defined in claim 1, wherein said support is configured as an annular support.

4. A holder as defined in claim 1, wherein the unlocking element is disposed on the top side of the support.

5. A holder as defined in claim 1, wherein said second locking device is configured so that it holds said support in said raised position against a vertical force.

6. A holder as defined in claim 1, wherein said second locking device is configured so that it provides a locking to hold said support in said raised position by a projecting element engaging into a receiving element.

7. A holder as defined in claim 6, wherein said projecting element is configured as a bolt, while said receiving element is configured as a cut-out in which said bolt is moved.

8. A holder as defined in claim 1, wherein said first unlockable locking device has an element which is moveable in a substantially horizontal direction transversely, said second locking device has an element which is mounted pivotably, and said unlocking element for manual unlocking is moveable vertically.

9. A holder as defined in claim 8, wherein said first unlockable locking device has a locking element which is pivotably mounted on an element of said guide means.

10. A holder as defined in claim 9, wherein said second locking device has a further locking element which is arranged on said element of said guide means to be transversely displaceable relative to the latter.

* * * * *